Feb. 9, 1960

D. A. YOUNG ET AL 2,924,499

RECORDING DEVICES

Original Filed May 28, 1947

INVENTORS
Douglass A. Young,
Lawrence J. Lunas
and John Walsweer.
BY
P. L. Freedman
ATTORNEY Feb. 9, 1960     D. A. YOUNG ET AL     2,924,499
RECORDING DEVICES Original Filed May 28, 1947     4 Sheets-Sheet 4

INVENTORS
Douglass A. Young,
Lawrence J. Lunas
and John Walsweer.
ATTORNEY

United States Patent Office 2,924,499
Patented Feb. 9, 1960

2,924,499
RECORDING DEVICES

Douglass A. Young, South Orange, and Lawrence J. Lunas, Cedar Grove, N.J., and John Walsweer, Palatine, Ill., assignors to Westinghouse Electric Corporation, East Pittsburgh, Pa., a corporation of Pennsylvania Original application May 28, 1947, Serial No. 750,935, now Patent No. 2,669,501, dated February 16, 1954. Divided and this application July 29, 1953, Serial No. 370,937

3 Claims. (Cl. 346—145)

This invention relates to recording devices, and it has particular relation to recording devices employing recording pens for marking a record on a movable chart strip.

This is a division of a copending patent application filed May 28, 1947, Serial No. 750,935, which is now Patent 2,669,501.

In many applications of recording devices, it is desirable to mount the recording devices in very compact arrangements. For example, on switchboard panels, it is desirable to mount recording instruments on centers spaced apart by only six inches. At the same time, it is also desirable to employ a chart strip providing a wide scale. On a recording device suitable for mounting on six-inch centers, a chart strip preferably should be capable of providing a record at least four inches in length.

The problem of designing a compact recording device is further complicated by the service requirements thereof. A recording device requires attention at intervals for the purpose of servicing or replacing recording pens and chart strips. If a spring motor is employed for advancing the chart strip, the motor must be rewound at regular intervals. Also, inkwells must be filled and instrument adjustments made.

In accordance with the invention, a recording device is provided which may be completely serviced from the front thereof. To this end, the recording device is divided into two major components which may be termed, respectively, a fixed unit and a removable unit. The fixed unit is designed to be mounted permanently on a suitable mount, such as a switchboard panel. It contains a recording pen, mechanism such as an electrical instrument for actuating the recording pen, an inkwell for supplying ink to the recording pen, a scale if an indication of the movement of the recording pen is desired, and mounting means for mounting the movable unit.

The movable unit comprises a chart carriage for receiving and advancing a chart strip with respect to the recording pen. This chart carriage is normally maintained in operative position with respect to the recording pen. However, to facilitate servicing operations, the chart carriage may be moved in a first direction to clear the recording pen, and subsequently tilted to a service position with respect to the fixed unit, for the purpose of exposing parts of the recording device. When in the service position, the chart carriage may be removed from the fixed unit in response to relative movement therebetween.

To facilitate inspection of the chart strip and replacement thereof, mechanism is provided for normally retaining a rewind roll in operative position. When a servicing operation is desired, ejector mechanism may be actuated to eject the rewind roll from its operative position to an accessible service position.

The invention further contemplates the provision of a recording pen which is readily removable from the front of the recording device. The recording pen is designed to provide a light structure and good contact with the chart strip during sudden movements of the recording pen.

The inkwell for the recording pen normally is mounted in a position which is relatively inaccessible. However, a suitable linkage is provided for moving the inkwell to a readily accessible service position. The same linkage may be employed for moving a scale, if employed, to a position clear of other parts requiring servicing. Preferably, the linkage is interlocked with the chart carriage to prevent operation thereof until the chart carriage is removed from its operative position.

It is, therefore, an object of the invention to provide a compact and accessible recording device.

It is a further object of the invention to provide a recording device having a recording pen and having a chart carriage movable in a first direction with respect to the recording pen to an intermediate position and pivotable from the intermediate position about an axis transverse to the first direction.

It is an additional object of the invention to provide a recording device having mechanism for ejecting a rewind roll employed in the device.

It is another object of the invention to provide a recording device having linkage for moving an inkwell from a relatively inaccessible position to an accessible service position.

It is also an object of the invention to provide a recording device having a scale which may be moved for the purpose of exposing other parts of the recording device.

It is a still further object of the invention to provide a recording device having a recording pen element of light weight.

It is an additional object of the invention to provide a recording device having all parts requiring service readily accessible from the front of the recording device.

Other objects of the invention will be apparent from the following description taken in conjunction with the accompanying drawings, in which.

Figure 1:
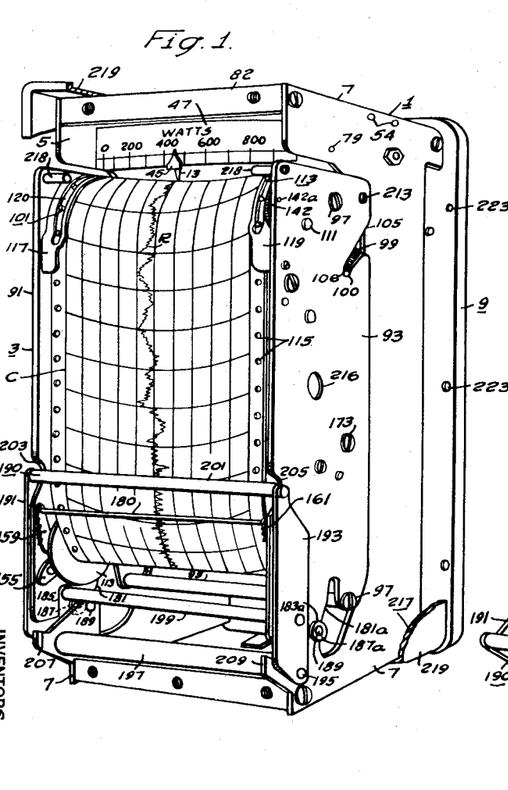
Figure 1 is a view in perspective, with parts broken away, of a recording device embodying the invention.

Referring to the drawings, Figure 1 shows a recording device which may be divided into two principal components. These consist of a fixed unit 1 which may be mounted on any suitable mount, such as a switchboard panel, and a movable unit 3 which is shown in operative position with respect to the fixed unit 1 and which may be moved with respect thereto.

Figure 3:
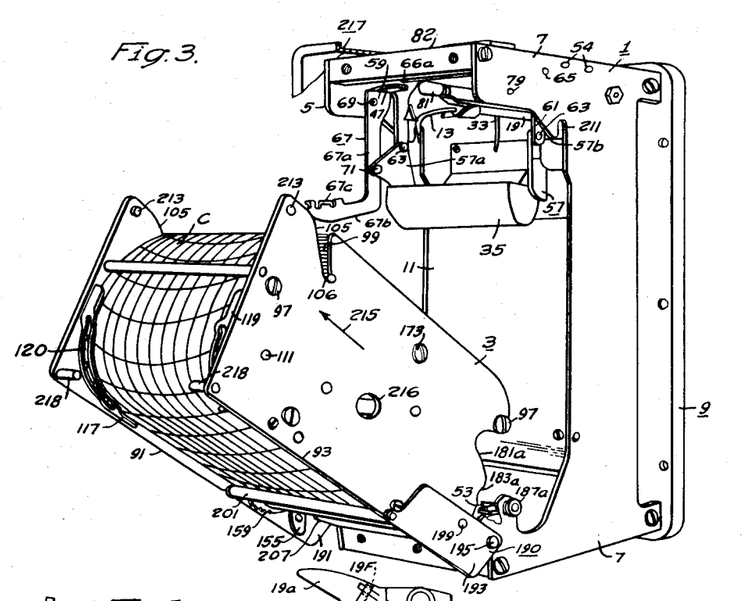
Fig. 3 is a view in perspective of the recording device shown in Fig. 1, showing still different relative positions of the parts thereof.
Figures 4, 4A, 5, 5A:
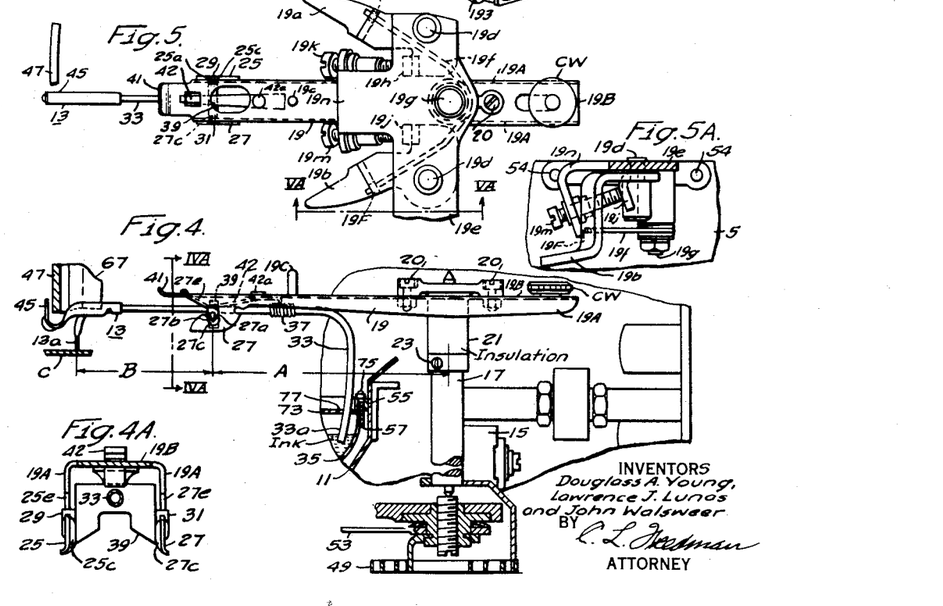
Fig. 4 is a detail view in elevation, with parts broken away, showing a recording pen and the upper part of an instrument suitable for the recording device of Fig. 1.
Fig. 4A is a view in section taken on the line IVA—IVA of Fig. 4.
Fig. 5 is a view in top plan of the mechanism shown in Fig. 4 with parts added.
Fig. 5A is a view in side elevation taken on the line VA—VA of Fig. 5.

As shown more clearly in Fig. 3, the fixed unit 1 includes two parallel spaced side walls 5 and 7 which are secured to a base member 9. In addition, a front wall 11 extends between the side walls 5 and 7. These walls may be formed of any suitable sheet material, such as sheet steel, brass, or aluminum. The enclosure formed by the walls and base member contains a mechanism for actuating a recording pen 13 in accordance with a quantity to be recorded. The top portion of such mechanism is indicated in Fig. 4 by a reference character 15. As representative of mechanisms suitable for the recording device, an ammeter, a voltmeter or a wattmeter may be employed. Electrical connections for an electrical instrument, if employed, may be passed through the base member 9, but are not illustrated in the drawings.

As shown in Fig. 4, the electrical instrument 15 has a vertical shaft 17 which is rotated in accordance with the magnitude of a quantity to be recorded. A pen bracket 19 is secured to the shaft 17 in any suitable manner for rotation therewith. This bracket may have substantially a channel cross-section to provide a rigid structure of low weight. The channel may be constructed from light-weight material such as duralumin or sheet aluminum, and may have side flanges 19A bent at right angles to a top wall 19B. As illustrated in Fig. 4, the pen bracket has secured thereto by bolts 20 a bushing 21 which is proportioned to receive therein the shaft 17. A set-screw 23, which is in threaded engagement with the bushing 21, engages the shaft 17 to secure the bushing thereto. In some cases it may be desirable to construct the bushing 21 from insulating material.

At its front end, the pen bracket has its flanges enlarged to provide a pair of spaced parallel bearing supports 25 and 27. Each of the bearing supports is provided with a notch 25a or 27a, for receiving knife-edge pivots 29 and 31 which are secured to the recording pen 13. The notches are substantially larger than the pivots to provide ample clearance for parts of the pivots other than the knife edges. The shape of the notches will be understood by an examination of the notch 27a in Fig. 4. It will be noted that the notch has a surface 27b engaging the pivot 31. The surface 27b may be provided by a phosphor bronze insert 27c which is riveted or otherwise secured to the bearing support 27 if a material other than that of the supports is desired for bearing purposes. A similar insert 25c may be provided for the bearing support 25.

By inspection of Figs. 4 and 5, it will be observed that the pivots 29 and 31 cooperate with the bearing supports 25 and 27 to mount the recording pen 13 for pivotal movement about a horizontal axis with respect to the pen bracket 19. It will be observed further that this horizontal axis is spaced from the vertical axis of the shaft 17 by a distance A which is a major part of the distance $A+B$ between the pen point 13a of the recording pen and the vertical axis of the shaft 17. In a unit actually constructed, the distance A was approximately two-thirds of the total distance $A+B$. This construction facilitates the design of an extremely light recording pen 13.

The recording pen comprises a small capillary tube 33 which extends from the pen point 13a toward the shaft 17. The tube 33 has its end nearest the shaft 17 bent downwardly for reception in an inkwell 35. Consequently, ink from the inkwell 35 is supplied through the tube 33 to the pen point 13a for application to a chart strip C positioned beneath the pen point. The inkwell may be located approximately midway between the shaft 17 and a vertical line intersecting the horizontal axis defined by the pivots 29 and 31.

It will be noted further that the pivots 29 and 31 are disposed between the ends of the tube 33. Consequently, portions of the tube 33 on opposite sides of the pivots tend to balance each other. Additional balancing is obtained by means of the weight of a coil spring 37 having turns which frictionally grip the tube 33. The parameters may be selected to permit location of the spring 37 on either side of the horizontal axis. As shown in Fig. 4, the spring is on the right of the axis. By inspection of Fig. 4, it will be observed that the position of the spring 37 is readily adjustable along the tube 33 for the purpose of adjusting the balance of the recording pen.

The positions of the pivots 29 and 31 are so selected that centrifugal force resulting from rotation of the shaft 17 urges the pen point 13a into firmer contact with the chart strip C. A bracket 39 secures the pivots to the tube 33. It will be noted that the axis of rotation of the tube 33 established by the pivots 29 and 31 is substantially below the tube. The displacement of the axis relative to the tube is so related to the parameters of the pen-assembly that moments about the axis produced by centrifugal forces resulting from rotation of the shaft 17 maintain the pen in contact with the chart strip C. With the construction illustrated in Figs. 4 and 5, it has been found feasible to reduce the static pressure of the recording pen against the chart strip C appreciably below values conventionally employed. For example, a pressure of only 20 milligrams has been found adequate in a recording device built and tested.

Since the recording pen is of extremely light construction, and since the pivots 29 and 31 are relatively close to the pen point 13a, irregularities of the surface of the chart strip C do not tend to force the pen point appreciably away from the chart strip. As a matter of fact, in actual operation, it has been found that violent movement of the recording pen about the axis of the shaft 17 does not prevent the production of a legible record on the chart strip. Preferably, the bracket 19 and associated pen assembly are balanced relative to the shaft 17, as by a counterweight CW adjustably secured to the bracket 19.

The pen bracket 19 is provided with a guide tongue 41 for guiding the recording pen relative to the bracket 19 into its operative position. Openings 25e and 27e in the supports 25 and 27 permit introduction of the pivots into the notches 25a and 27a. In order to remove the recording pen, it is merely necessary to raise the pen sufficiently for the pivots 31 and 29 to clear the notches 25a and 27a. The recording pen then is withdrawn toward the front of the recording device.

A leaf spring 42 may have one end secured to the top wall 19B in any suitable manner. This spring has a resilient portion positioned slightly above the bracket 39 to prevent accidental displacement of the knife edges from the associated notches. The bracket may be moved upwardly to deflect the spring when it is desired to remove the pen from its operative position.

If an indication of the movement of the recording pen is desired, a target 45 may be secured to the end of the recording pen. This target preferably is constructed of a light-weight material such as sheet aluminum suitably bent or formed, and is positioned to rotate across the front of a scale 47 as the shaft 17 of Fig. 4 rotates.

The pen structure is shown in somewhat greater detail in the copending application of D. A. Young et al. Serial No. 750,936, filed of even date herewith, which has issued as Patent 2,626,201.

In many instruments employed for recording devices, a zero adjuster mechanism is provided. The zero adjuster mechanism may be located at any desired point. Conveniently, it may be located adjacent the lower end of the shaft 17, as viewed in Fig. 4, and may be similar to the zero adjuster mechanism shown in Fig. 22 of the L. J. Lunas patent application, Serial No. 570,028, filed December 27, 1944, which is now Patent 2,508,410. For example, if the instrument 15 of Fig. 4 is similar to the instrument shown in Fig. 22 of the aforesaid Lunas patent application, it may have a control spring 49 and a zero adjuster arm 53 located adjacent the lower end of the shaft 17 in the manner described in said patent application. The outer end of the spring 49 is secured to the shaft 17. As well understood in the art, rotation of the arm 53 varies the position of the inner abutment of the spring 49 to adjust the zero position of the associated instrument. Preferably, the arm 53 is adjustable from the front of the recording device, as indicated in Fig. 3.

Figure 7:
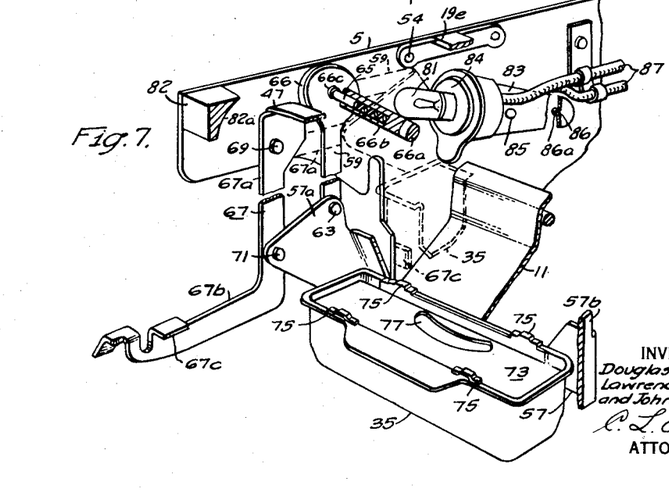
Fig. 7 is a view in perspective showing an inkwell and linkage associated therewith, suitable for the recording device of Fig. 1.

A pair of stops 19a and 19b (Fig. 5) are provided for limiting movement of the pen bracket 19 to a predetermined angle about the axis of the shaft 17. These stops are positioned in the path of a pin 19c which is secured to the pen bracket. The stops 19a and 19b are pivotally mounted by rivets 19d on a strut 19e which is suitably secured to the walls 5 and 7 by machine screws 54 (Figs. 5A, 7 and 3). A spring wire 19f is coiled around a post 19g secured to the strut and has its ends positioned in holes 19f in the stops 19a and 19b for urging the stops respectively in clockwise and counterclockwise directions as viewed in Fig. 5. The spring wire urges abutments 19h and 19j, which are secured respectively to the stops 19a and 19b into engagement with adjusting screws 19k and 19m. These screws are in threaded engagement with a bracket 19n secured to the strut 19e and are adjustable from the front of the recording device for positioning properly the stops 19a and 19b. For example, rotation of the screw 19m rotates the stop 19b about the axis of the associated rivet 19d.

The inkwell 35 in operative position is relatively inaccessible from the front of the recording device. In order to facilitate servicing of the inkwell, linkage is provided for moving the inkwell from its operative position to a service position wherein it is readily accessible from the front of the recording device.

As shown in Fig. 4, the inkwell 35 is provided with a lip 55 for retaining the inkwell on a bracket 57. By lifting the inkwell with respect to the bracket 57, the inkwell can be detached completely from the bracket.

As shown in Figs. 3 and 7, the bracket 57 has its ends 57a and 57b bent parallel to the side walls 5 and 7 of the fixed unit. These ends 57a and 57b are each pivotally attached to one of a pair of similar links 59 and 61 by means of suitable rivets 63. The links 59 and 61 are pivotally attached respectively to the side walls 5 and 7 by means of pins 65. If desired, a friction disc 66, such as a leather disc, may be interposed between the upper end of the link 59 and the wall 5. The link may be urged towards the wall 5 in any suitable manner to compress the disc 66 and hold the link in any position of adjustment. For example, a rod 66a may have recesses 66b at each end for receiving the pins 65. A helical spring in one or both of the recesses urges a collar 66c centrally disposed on each pin towards the associated link.

In order to maintain the inkwell 35 level during movement thereof, a lever 67 is pivoted to the side wall 5 by means of a rivet 69 and to the end 57a of the bracket 57 by means of a rivet 71. The lever 67 provides a link 67a for the inkwell which is parallel and equal in length to the link 59. Consequently, this parallel linkage prevents the inkwell from tilting during movement thereof from operative to service positions.

By inspection of Fig. 7, it will be noted that the lever 67 comprises a portion 67b which is perpendicularly related to the link 67a. Movement of the inkwell may be effected from the front of the recording device by grasping the portion 67b and moving the lever 67 to the desired position. When the inkwell is in operative position (shown dotted in Fig. 7 and in full lines in Fig. 4) a lip 67c on the lever 67 is positioned in front of the front wall 11 of the fixed unit.

The inkwell 35 is provided with a detachable cover 73 which has lips 75 resting on the upper edge of the inkwell. The cover 73 may be removed by lifting it from the inkwell 35. It will be noted that the cover 73 has an arcuate slot 77 for reception of an end 33a of the tube 33. By reference to Fig. 4, it will be noted that the end 33a of the tube 33 is bent in the direction of travel of the inkwell 35 during its movement from operative position. This facilitates withdrawal of the tube 33 through the slot 77 in the cover 73 during such movement.

By reference to Fig. 1, it will be noted that the scale 47 extends over a substantial part of the front of the recording device. In order to provide greater access for parts of the recording device behind the scale, the scale may be pivotally mounted for movement from the position illustrated in Fig. 1 to the position illustrated in Figs. 3 and 7. To this end, the scale may be pivotally secured to the side wall 7 by means of a rivet 79 and it may be rigidly secured to the upper part of the lever 67. Consequently, actuation of the lever 67 to move the inkwell 35 from its operative to its service position simultaneously rotates the scale 47 from the position illustrated in Fig. 1 to the position illustrated in Figs. 3 and 7. In the latter position, the recording pen 13 and the inkwell 35 are wholly accessible from the front of the recording device.

If the scale 47 is of light-permeable material, it may be illuminated by means of an electric lamp 81. Preferably, the scale is of opaque material, and is illuminated by light reflected from the lamp 81 by the rear surface 82a of a cross bar 82 which extends between the walls 5 and 7. This rear surface may be properly shaped and painted white to reflect light. As shown in Fig. 7, the electric lamp 81 is mounted in a socket 84 secured to a bracket or holder 83 which is pivotally attached to the side wall 5 in any suitable manner as by means of a rivet 85. If it is necessary to replace a lamp 81, the holder 83 may be pivoted about the rivet 85 to place the lamp 81 in a position more accessible from the front of the recording device. The holder 83 has a bump or protuberance 86 projecting towards the wall 5. This protuberance is proportioned for entry into a hole 86a provided in the wall 5 to retain the holder in operative position. Resilience of the holder permits the protuberance to ride out of the hole 86a when the holder is pivoted about the rivet 85. Flexible conductors 87 are provided for connecting the lamp 81 to a suitable source of electrical energy.

As previously explained, the recording device includes a movable unit or chart carriage 3. As shown in Fig. 1, the chart carriage 3 includes two spaced parallel plates 91 and 93 which may be formed of any suitable sheet material, such as steel, brass or aluminum. The plates 91 and 93 are rigidly secured to each other in any suitable manner as by means of spacing rods 95 which are secured to the plates by means of machine screws 97. The chart strip C is fed from a supply roll 99 over a feed roll or drum 101 to a rewind roll 103. The mechanism for guiding and advancing the chart strip C may be described more clearly by reference to Fig. 6, wherein the path of the chart C is illustrated by a dot and dash line.

The supply roll 99 has a shaft 100 which projects from the ends of the supply roll. The ends of the shaft are received respectively in slots 105 which are formed in the plates 91 and 93. By inspection of Fig. 6, it will be noted that the slots 105 are inclined downwardly, and have lower portions 106 which are substantially vertical. Consequently, gravity tends to retain the supply roll 99 at the bottom of the portions 106 of the slots 105. However, the supply roll 99 may be removed readily through the slots for servicing or replacement. A shield plate 107 surrounds the lower face of the supply roll to protect the chart strip.

The chart strip C from the supply roll 99 is fed under a guide roll 109 and over a table 110. The table 110 supports the chart strip under the recording pen to present a flat horizontal surface for reception of a record.

From the table 110, the chart strip passes over the feed roll or drum 101. This feed roll is mounted for rotation about the axis of a supporting shaft 111. It will be noted that the feed roll 101 has uniformly spaced sprocket teeth 113 positioned around each end of the roll. These sprocket teeth enter holes 115 (Fig. 1) which are punched in the edges of the chart strip for the purpose of advancing the chart strip in a manner well understood in the art. Clips 117 and 119 are positioned adjacent the edges of the feed roll 101 for the purpose of retaining the chart strip in position during feeding operations. It will be noted that these clips have slots 120 which permit passage therethrough of the sprocket teeth 113. These clips may be pivoted about an axis 121 (Fig. 6) for movement away from the feed roll 101 to permit ready removal and replacement of the chart strip in a manner well understood in the art.

Figure 6:
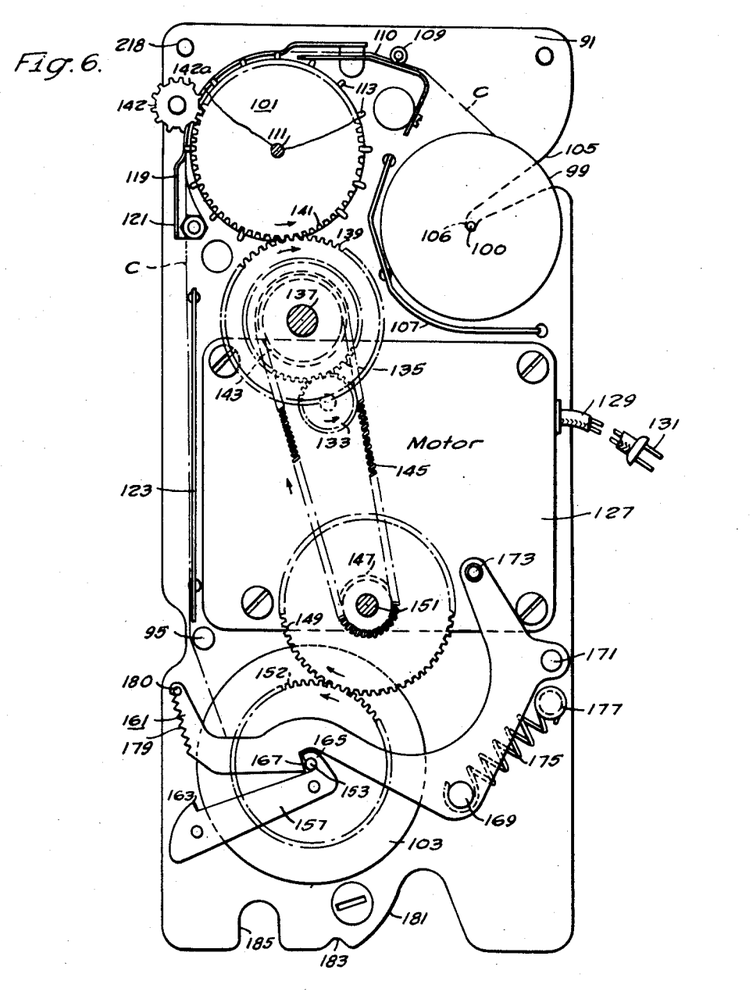
Fig. 6 is a view in side elevation, with a side plate removed, of a chart carriage suitable for the recording device of Fig. 1.

As further shown in Fig. 6, the chart strip C in leaving the feed roll 101 passes over a vertical table 123. This table supports the chart strip for receiption of any desired notation or additional record information which the operator may desire to write or mark on the chart strip. From the table 123, the chart strip C passes to the rewind roll 103.

The chart strip is advanced by means of a suitable motor 127. This motor may be either of a spring-wound type or of the synchronous electrical type. Electrical connections 129 are provided for the purpose of energizing an electrical motor if such a motor is utilized. The connections 129 are flexible and terminate in a plug 131 for reception in a socket (not shown) carried by the fixed unit. Consequently, if the chart carriage is to be removed from the fixed unit, electrical connections may be readily interrupted by withdrawal of the plug 131 from its socket.

The motor 127 has a pinion 133 which engages a gear 135 mounted for rotation on a shaft 137. The gear 135 is rigidly attached to a gear 139 for rotation as a unit about the same axis. The gear 139 engages a gear 141 which is attached to the feed roll 101 for rotation therewith about the axis of the shaft 111. Consequently, the motor 127 drives at a substantially uniform rate of rotation the feed roll 101, and uniformly advances the chart strip C. In order to facilitate manual adjustment of the feed roll 101 for timing or other purposes from the front of the recording device, a gear 142 meshes with the gear 141. The gear 142 is mounted for rotation about the axis of a rivet or screw 142a which secures the gear to the plate 91 (Fig. 1). An operator may rotate the gear 142 manually for the purpose of adjusting the feed roll.

The motor 127 also is employed for rotating the rewind roll 103. To this end, a drive pulley 143 is mounted for rotation about the shaft 137. This drive pulley is coupled to the gear 135 through a conventional friction clutch (not shown) which permits the pulley to slip with respect to the gear 135 when an excessive load is applied to the drive pulley. The drive pulley is coupled through a belt 145 to a driven pulley 147. The driven pulley and a gear 149 are mounted for rotation as a unit about a shaft 151. The gear 149 engages a gear 152 which is secured to the rewind roll 103 for rotation therewith about the axis of a supporting shaft 153.

It will be understood that as paper is wound on the rewind roll 103, the diameter of the paper wound on the roll increases and the rate of rotation of the rewind roll necessary to receive the uniformly advanced chart strip decreases. The gear and pulley drives are so selected that the rewind roll 103 rotates with sufficient rapidity to receive the chart strip when the rewind roll is substantially empty. As the rewind roll fills, the friction clutch between the drive pulley and the gear 135 slips. Because of this slippage, the rewind roll 103 is always urged in the proper direction to take up more slack in the chart strip but does not stall the motor as the rewind roll fills. If desired, the friction clutch may be eliminated and slippage of the belt 145 may be relied on to prevent stalling of the motor as the rewind roll fills. As illustrated, the belt 145 is formed of a spiral spring which may be constructed of a suitable metal, such as steel or brass.

Figure 2:
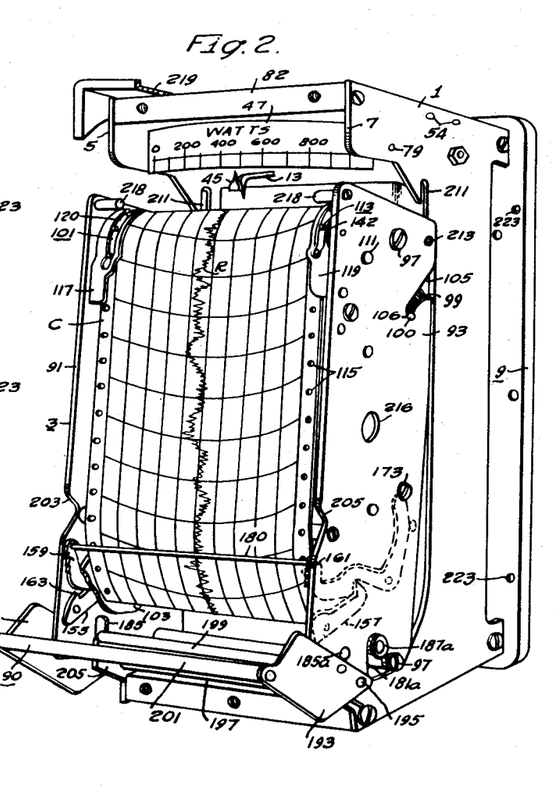
Fig. 2 is a view in perspective of the recording device shown in Fig. 1, having the parts thereof in different relative positions.

In order to facilitate removal and replacement of the rewind roll 103 from the front of the recording device, the shaft 153 has extensions resting on two guide rails 155 and 157 which are secured, respectively, to the plates 91 and 93 (see Fig. 2). The rails cooperate, respectively, with latches 159 and 161 for controlling the retention and ejection of the rewind roll. The latches 159 and 161 are rigidly secured to each other for movement as a unit. The structure of the rails and latches may be understood by reference to Fig. 6.

In Fig. 6, it will be noted that the guide rail 157 is inclined downwardly. Consequently, if the rewind roll 103 were free to move, it would tend to move under the influence of gravity from the position illustrated in Fig. 6 to a position wherein the shaft 153 abuts a stop 163. A similar stop is provided on each guide rail. In this position, the rewind roll 103 would be fully accessible from the front. It could be lifted from the guide rails for inspection of an early portion of the chart strip or it could be removed for replacement purposes.

In order to retain the shaft 153 in the position illustrated in Fig. 6, each of the guide rails is provided with a hook 165 which prevents movement of a shaft 153 in an upward direction or to the right as viewed in Fig. 6. Each of the latches is provided with a retaining lip 167 for retaining the shaft 153 in the associated hook 165. Consequently, when the latches are raised, the shaft 153 is free to move from the position illustrated in Fig. 6 to a position in engagement with the stops 163.

As previously explained, the latches are rigidly connected to each other in any suitable manner as by means of rods 169 and 171 which may be riveted to the latches. Each of the latches 159 and 161 is secured to its associated side plate 91 or 93 by any suitable means such as a machine screw 173 for rotation with respect to the plate about the axis of the machine screws. Each latch is biased towards the position illustrated in Fig. 6 by means of a helical spring 175 extending between the rod 169 and a rod 177 which is secured to the side plates 91 and 93. In order to facilitate movement of the latches from the front of the chart carriage, the front edge of the latches may be serrated or roughened, as indicated in Fig. 6 by the reference character 179. Preferably, however, the latches have an operating rod 180 connecting their exposed ends. This rod 80 not only assists in securing the latches rigidly to each other, but it is readily grasped for releasing the roll 103.

When it is desired to inspect a portion of the chart strip located on the rewind roll 103, the latches are rotated in a clockwise direction as viewed in Fig. 6 to remove the lips 167 from the associated shaft 153. This frees the roll 103 for movement down the rails 155 and 157. Continued rotation of the latches 161 brings the rod 169 into engagement with the rewind roll 103 and positively forces the rewind roll 103 down the rails towards the stops 163. The gears 149 and 152 are so located that the desired movement of the rewind roll 103 disengages the gears. The rewind roll next may be lifted over the stops 163 and dropped to clear the rod 180, if the rod is employed.

In order to replace the rewind roll, the rewind roll is placed on the rails adjacent the stops 163 and merely forced to the right as viewed in Fig. 6. During such movement, the ends of the shaft 153 force the latches in a clockwise direction as viewed in Fig. 6 until the shaft 153 is received within the hooks 165. The latches then move in a clockwise direction under the influence of the spring 175 to retain the shaft 153 in operative position.

If desired, the roll 103 may be driven from the gear 152 through mechanism of the "window-shade roller" type which is well known in the art. With such mechanism the roll 103 is driven from the gear 152 through a long helical or spiral spring of the window-shade type. The chart strip C may be pulled from the roll against the resistance of the spring for inspection. On release of the chart strip, the spring rewinds it on the roll.

As clearly shown in Fig. 6, the plate 91 has its bottom configured to provide a cam surface 181 which at its lower end terminates in a slight recess 183. In addition, the bottom of the plate 91 is provided with a slot 185. As shown clearly in Figs. 1, 2 and 3, the plate 93 similarly has its lower end configured to provide a similar cam surface 181a, a similar recess 183a and a similar slot 185a. The cam surfaces 181 and 181a are intended to guide the chart carriage 3 between the operative position relative to the fixed unit 1 which is illustrated in Fig. 1 and an intermediate position which is illustrated in Fig. 2. To this end each of the side walls 5 and 7 is provided with a cam follower in the form of a roller 187 or 187a which is rotatably secured to the associated side wall by means of a suitable rivet 189. When the chart carriage is in the position illustrated in Fig. 1, the cam followers 187 and 187a are received, respectively, in the recesses 183 and 183a to retain the chart carriage in operative position.

When the bottom of the chart carriage is moved forwardly, the cam followers 187 and 187a move out of the recesses 183 and 183a to engage the inclined cam surfaces 181 and 181a. Because of the recesses, a substantial force must be applied to effect this movement of the chart carriage. The cam surfaces next ride down the cam followers to guide the chart carriage to the intermediate position illustrated in Fig. 2.

In order to effect the desired forward movement of the chart carriage, a lever 190 is provided comprising a pair of plates 191 and 193 which are pivotally attached respectively to the support formed by the side walls 5 and 7 in any suitable manner as by means of a shaft 195 which extends through both of the side walls and which passes through a spacing sleeve 197. The ends of the shaft 195 may be upset or riveted to secure the parts in the positions illustrated in Fig. 1. The plates 193 and 191 also have secured thereto a pair of rods 199 and 201 to form the rigid lever 190. It will be noted that the rod 201 in the position illustrated in Fig. 1 forms a handle which is received in notches 203 and 205 formed in the side plates 91 and 93. The rod 199 is positioned in the slots 185 and 185a.

The lever 190 may be rotated in a counterclockwise direction as viewed in Fig. 1 about the shaft 195 from the position illustrated in Fig. 1 to the position illustrated in Fig. 2. In the latter position, the rod 199 engages stops 207 and 209 formed by extensions of the side walls 5 and 7. As a result of such movement of the lever 190, the rod 199 engages the front surfaces of the slots 185 and 185a to force the bottom of the chart carriage in a forward direction to the position illustrated in Fig. 2. During the resulting movement of the chart carriage, it will be recalled that the chart followers 147 and 147a are forced out of their associated recesses 183 and 183a and that the cam surfaces 181 and 181a ride down the cam followers to guide the chart carriage from the operative position illustrated in Fig. 1 to the intermediate position illustrated in Fig. 2.

By inspection of Fig. 2, it will be noted that in its intermediate position, the chart strip C and all parts of the chart carriage are completely clear of the recording pen 13. To retain the upper part of the chart carriage in operative position, the side walls 5 and 7 are provided with slots 211 for reception of pins 213 which are carried respectively by the plates 91 and 93. These pins may be seen more clearly in Fig. 3. As the chart carriage moves from the operative position illustrated in Fig. 1 to the intermediate position illustrated in Fig. 2, the pins 213 move out of their associated slots 211.

The foregoing movement of the chart carriage to clear the recording pen eliminates the need for special mechanism for lifting the pen to clear the chart carriage. Furthermore, such movement permits the scale 47 to remain fixed in a position even though the target 45 normally is located in front of the scale. When the chart carriage is moved to operative position, it may raise the pen during the last portion of its movement. The location of the target in front of the scale facilitates the reading of the indications.

If it is desired to return the chart carriage from the position illustrated in Fig. 2 to the operative position illustrated in Fig. 1, the lever 190 is moved in a clockwise direction as viewed in Fig. 2 to force the cam surfaces 181 and 181a to ride up their associated cam followers 187 and 187a. This forces the chart carriage from the intermediate position illustrated in Fig. 2 to the operative position illustrated in Fig. 1. During the last portion of the movement of the lever 190, the cam followers 187 and 187a are forced into their associated recesses 183 and 183a to retain the chart carriage in operative position. In addition, the pins 213 move into their associated slots 211 to retain the upper portion of the chart carriage in operative position.

It should be noted further that as the lever 190 is actuated from the position illustrated in Fig. 2 to that shown in Fig. 1, the load applied by the chart carriage to the lever passes over the axis of rotation of the lever. In either position of the lever, the load thereon tends to maintain the lever in the desired position.

By inspection of Fig. 2, it will be observed that when the chart carriage 3 is in the intermediate position it is free for forward pivotal movement in a counterclockwise direction about an axis parallel to the axes of the supply roll, the feed roll and the rewind roll. Such pivotal movement carries the chart carriage from the position illustrated in Fig. 2 to the position illustrated in Fig. 3. In this movement, the chart carriage pivots about the rod 199 until the handle 201 again engages the side plates 91 and 93 to stop further pivotal movement of the chart carriage. In the position illustrated in Fig. 2, the lever 190 provides an extended stop for the chart carriage. Consequently, the chart carriage is securely held in the position illustrated in Fig. 3.

If it is desired to remove the chart carriage completely from the fixed unit 1, the chart carriage may be grasped and moved in the direction of the arrow 215 (Fig. 3). In response to such movement, the chart carriage completely clears its mounting and is completely removed from the associated fixed unit 1. Prior to such removal, any connections between the fixed unit and a motor mounted on the chart carriage (if an electrical motor) should be broken. A reversal of this procedure replaces the chart carriage in the position illustrated in Fig. 3. If it is desired to return the chart carriage from the service position illustrated in Fig. 3 to the intermediate position shown in Fig. 2, the chart carriage is merely moved in a clockwise direction about the rod 199 to the position illustrated in Fig. 2.

When the parts are in the positions illustrated in Fig. 2, the center of gravity of the chart carriage is on the right of the rod 199. Gravity suffices to retain the chart carriage in the intermediate position. In Fig. 3 the center of gravity of the chart carriage is on the left of the rod 199. Therefore, gravity retains the chart carriage in the position illustrated.

It will be noted that with the parts in the position illustrated in Fig. 2, the latches 159 and 161 may be manipulated to eject the rewind roll 103 for inspection and servicing. Also the rewind roll may be replaced after the desired inspection or servicing operations.

With the chart carriage in the position illustrated in Fig. 3, the supply roll 99 is accessible for removal and replacement. In addition, if a spring wound motor is employed, the motor may be rewound by inserting a suitable key in an opening 216 provided in one of the side plates. Furthermore, the lever 67 may be actuated to move the inkwell 35 from its operative to its service position. Such movement of the lever 67 pivots the scale 47 to expose the recording pen 13 and to permit access to the electric lamp 81. The recording pen 13 then may be removed from its associated bracket 19. Also the inkwell may be raised from its bracket 57 and withdrawn for cleaning or other servicing operation.

Since the carriage, when in the position illustrated in Figs. 1 and 2, may be substantially surrounded by a casing 217, pins or handles 218 may be secured to the plates 91 and 93 to facilitate movement of the chart carriage from the position illustrated in Fig. 2 to the position illustrated in Fig. 3.

Figure 8:
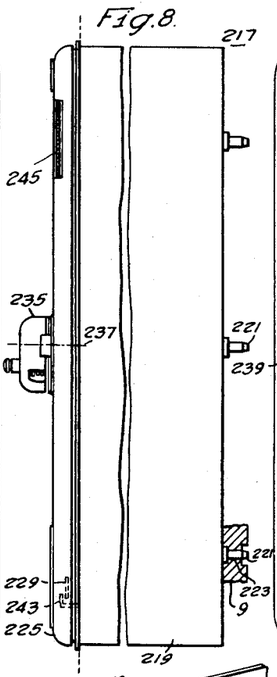
Fig. 8 is a view in side elevation of a casing suitable for the recording device of Fig. 1.
Figure 9:
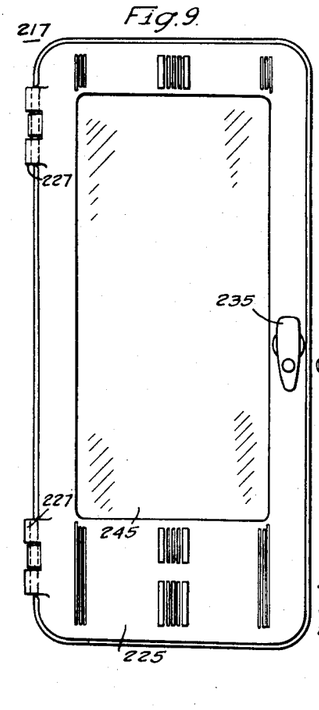
Fig. 9 is a view in front elevation of the casing illustrated in Fig. 8.
Figure 10:
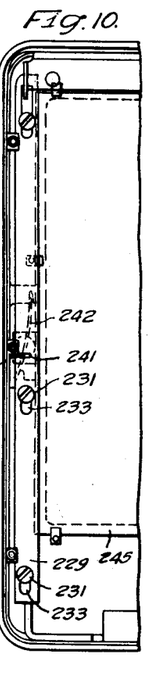
Fig. 10 is a view in rear elevation with parts broken away of the door employed for the casing of Fig. 8.
Figure 11:
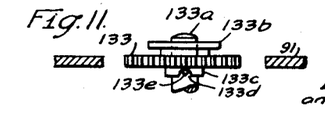
Fig. 11 is a detail view of attaching means for a removable gear employed in the recording device of Fig. 1.

The casing 217 is shown more particularly in Figs. 8, 9 and 10. It will be noted that the casing includes a rectangular wall 219 which is proportioned to surround the side walls and plates of the recording device. The rectangular wall has, at its rear edge, a plurality of pins 221 proportioned for reception in holes 223 which are provided in the base plate 9 of the recording device. The casing 217 may be detachably or permanently secured to the base plate 9. For example, the pins may be projected through the holes 223 and their exposed ends may be upset to secure the rectangular wall 219 securely to the base plate 9.

The front opening of the rectangular wall 219 is covered by means of a cover 225 which is hinged at one side to the rectangular wall by suitable hinges 227. The cover is retained in closed position by a suitable latching bar 229 which is secured to the inner face of the cover by means of suitable machine screws 231. These machine screws pass through slots 233 in the latching bar which are designed to permit a limited vertical movement of the latching bar. Such movement is effected by rotation of a handle 235 projecting from the front of the cover. The handle 235 is mounted for rotation about an axis 237 and has an off-set pin 239 which projects through a horizontal slot 241 in the latch bar 229. Consequently, rotation of the handle 235 in a clockwise direction, as viewed in Fig. 9, rotates the pin 239 in a counterclockwise direction, as viewed in Fig. 10, to lift the latch bar 229.

A spring wire 242 has its ends positioned in slots provided in the cover. The central portion of the wire engages the pin 239 to bias the handle 235 in a clockwise direction as viewed in Fig. 10.

In its latching position, the latch bar may cooperate with retaining tongues or lips secured to the rectangular wall 219 to retain the cover in closed position. For example, in Fig. 8 a retaining lip 243 is secured to the rectangular wall 219 in a position to overlie the latching bar 229. When the latching bar is lifted in response to rotation of the handle 235, the end of the latching bar clears the lip 243 to permit opening of the cover 225. The cover 225 may have a transparent window 245 of glass or other suitable material to permit inspection of the chart strip therethrough.

It is believed that the operation of the recording device is apparent from the foregoing description. With the parts in the position illustrated in Fig. 1, the recording pen 13 rotates over the surface of the chart strip C to produce a record R thereon. In addition, the target 45 by its relationship to the scale 47 indicates at any instant the magnitude of the quantity being recorded. During this recording operation, the feed roll 101 continuously advances the chart strip from the supply roll 99 to the rewind roll 103.

If it is desired to inspect a portion of the record wound on the rewind roll 103, the rewind roll may be ejected by proper rotation of the latches 159 and 161. Alternately, if the rewind roll is driven by mechanism of the "window-shade roller" type previously discussed, the chart strip C may be pulled forward to unwind the desired part from the rewind roll.

In order to service the recording device, the handle 201 of the lever 190 is actuated from the position illustrated in Fig. 1 to the position illustrated in Fig. 2. Rotation of the handle 201 actuates the rod 199 to move the lower part of the chart carriage with respect to the cam followers 187 and 187a. The cam followers ride out of their associated recesses 183 and 183a and along the inclined cam surfaces 181 and 181a to guide the chart carriage from the operative position illustrated in Fig. 1 to that illustrated in Fig. 2. With the parts in this position, the rewind roll 103 still can be ejected by proper rotation of the latches 159 and 161. A reversal of the foregoing procedure may be employed for restoring the parts to the operative positions illustrated in Fig. 1.

If further servicing is required, the chart carriage may be moved from the intermediate position shown in Fig. 2 to the service position shown in Fig. 3 by grasping the pins 218 and rotating the chart carriage about the rod 199. The chart carriage is held in the position illustrated in Fig. 3 by means of the handle 201 and associated parts of the lever 190.

With the chart carriage in the service position illustrated in Fig. 3, the supply roll 99 may be removed for installation of a new chart strip. In addition, if a spring motor is employed for advancing the chart strip, it may be rewound by insertion of a suitable key through the opening 216. It should be noted that the opening 216 is clear of the casing 217 when the chart carriage is in the position illustrated in Fig. 3. If the chart carriage is to be removed completely, it is withdrawn in the direction of the arrow 215.

If it is desired to refill the inkwell, the inkwell may be moved from its operative position to its service position by rotation of the lever 67 in a clockwise direction as viewed in Fig. 3. The inkwell is shown in its service position in Fig. 3. Such movement of the lever 67 also pivots the scale 47 to expose parts of the recording device behind the scale. The inkwell may be removed for cleaning merely by lifting it from its supporting bracket. If an electrical lamp is to be replaced, the lamp holder is rotated to an accessible position and a replacement lamp is installed, after which the lamp holder may be restored to its operative position. The recording pen 13 may be removed from its supporting bracket 19 by successive movements of the recording pen in an upward direction and a forward direction for cleaning or other servicing operations. By a reversal of the foregoing steps, the various parts may be returned to their operative positions.

It should be noted that when the parts are in their operative positions, the lip 67c of the lever 67 is located between the chart carriage and the front wall 11. Because of this interlocking relationship, the inkwell cannot be disturbed until the chart carriage is moved away from its operative position.

Despite the fact that the casing 217 substantially surrounds the recording device, all parts requiring service are fully accessible from the front of the recording device. This means that the recordnig device may be mounted flush in a suitable panel without impairing the accessibility of parts. Furthermore, it will be noted that the structure permits the utilization of a wide chart. In a recording device designed for mounting on six inch centers, no difficulty has been encountered in providing a chart carriage capable of receiving a chart strip having a four inch scale.

If the chart carriage were designed to pivot about a vertical axis in its movement from the intermediate position to the service position the clearances required for such movement would make it difficult to provide a chart strip having the desired scale length. By moving the chart carriage in directions lying in planes perpendicular to the axes of the supply, feed and rewind rolls, optimum scale length is obtained.

It is desirable to provide different rates of advance for the chart strip. To this end, the gears 133 and 135 (Fig. 6) may be replaced by other gears providing different gear ratios. To facilitate replacement of the gears, the gears may be mounted on stub shafts accessible through openings provided in the side plate 91. For example, the pinion 133 may be mounted on a shaft 133a which constitutes the motor shaft by means of a nut 133b which is in threaded engagement with the end of the shaft. The pinion 133 has a hub 133c which is provided with a slot 133d. This slot is positioned to receive a pin 133e attached to the shaft 133a. The bottom of the slot 133d has a V configuration. Consequently, as the nut 133b is rotated to secure the pinion 133 to the shaft 133a, the pinion 133e is forced into the V-shaped bottom of the slot to locate the pinion accurately with respect to the shaft. A similar structure may be employed for securing the gear 135 to the shaft 137.

Although the invention has been described with reference to certain specific embodiments thereof, numerous modifications thereof are possible. Therefore, the appended claims have been drafted to cover all modifications falling within the spirit and scope of the invention.

We claim as our invention:

1. In a recording device, a support strip-feed means including a roll for receiving and advancing a recording strip, releasable means including a lever for retaining the roll on the support in operative position for rotation about the axis of the roll, said lever being pivotal relative to the support for actuating said releasable means to release the roll for movement relative to the support, said roll when released being movable in a predetermined direction relative to the remainder of the strip-feed means substantially transverse to said axis from an operative position to a second position displaced from the operative position wherein the roll is free of the releasable means, said lever and said roll having coacting parts responsive to pivotal movement of the lever relative to the support for urging the roll from the operative position to the second position.

2. In a recording device, a support, means including a horizontal roll for receiving and advancing a recording strip, horizontally-spaced ways engaging the ends of the roll for guiding said roll in a direction substantially transverse to the axis of the roll from an operative position to a service position displaced horizontally from the operative position, said ways being inclined for urging the roll under the influence of gravity towards the service position, stop means for stopping the roll at the service position, means for preventing upward movement of the roll when the roll is in operative position, a lever device pivotally mounted on the support, said lever device being pivotal from a first position to a second position, said lever device when in the first position and the roll having parts positioned to retain said roll in operative position, said lever device when moved away from the first position operating to produce relative motion of said parts for releasing the roll for movement along the ways, said lever device in moving from the first to the second position having a part positioned to force the roll along the ways towards the service position.

3. In a recording device, a support, feed means for receiving and advancing a recording strip, recording mechanism for applying a record to the recording strip, said means including a roll on which the recording strip is wound after receiving a record from the recording mechanism, releasable means releasably engaging the ends of the roll for retaining the roll in operative winding position on the support for rotation about a predetermined axis, said releasable means being operable for releasing the roll for movement in a direction substantially transverse to said axis to a position parallel to and horizontally displaced from the operative winding position, guide means for guiding said roll for movement in said direction, said guide means being inclined for urging the roll under the influence of gravity in said direction, forcing means operable for engaging the roll for urging said roll relative to the remainder of the feed means in said direction from the operative position toward a second position displaced from the operative position, and common operating means for sequentially operating the releasable means to release the roll and the forcing means to urge the roll towards the second position.

References Cited in the file of this patent

UNITED STATES PATENTS

| | | |
|---|---|---|
| 392,310 | Brewster | Nov. 6, 1888 |
| 425,066 | Etheridge | Apr. 8, 1890 |
| 494,649 | Schneider | Apr. 4, 1893 |
| 1,208,304 | Esterline | Dec. 12, 1916 |
| 1,599,268 | Angus | Sept. 7, 1926 |
| 1,811,417 | Bristol | June 23, 1931 |
| 1,847,918 | Blanchard | Mar. 1, 1932 |
| 2,008,970 | Spitzglass | July 23, 1935 |
| 2,074,118 | Ross et al. | Mar. 16, 1937 |
| 2,130,852 | Lunas | Sept. 20, 1938 |
| 2,257,998 | Beal | Oct. 7, 1941 |
| 2,308,710 | Nichols | Jan. 19, 1943 |
| 2,392,487 | Lee | Jan. 8, 1946 |
| 2,509,185 | Eckel | May 23, 1950 |
| 2,626,201 | Young et al. | Jan. 20, 1953 |
| 2,669,501 | Young et al. | Feb. 16, 1954 |

FOREIGN PATENTS

| | | |
|---|---|---|
| 590,512 | Germany | Jan. 9, 1934 |